(12) United States Patent
Adoni et al.

(10) Patent No.: US 10,948,916 B2
(45) Date of Patent: Mar. 16, 2021

(54) VEHICULAR IMPLEMENTED PROJECTION

(71) Applicant: INTERNATIONAL BUSINESS MACHINES CORPORATION, Armonk, NY (US)

(72) Inventors: Siddique M. Adoni, Bangalore (IN); Gregory J. Boss, Saginaw, MI (US); Shubhadip Ray, Seaucus, NJ (US); Dhandapani Shanmugam, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/200,865

(22) Filed: Nov. 27, 2018

(65) Prior Publication Data
US 2020/0166937 A1 May 28, 2020

(51) Int. Cl.
*H04N 7/18* (2006.01)
*G05D 1/00* (2006.01)
*G05B 13/02* (2006.01)
*B64C 39/02* (2006.01)
*G09F 19/18* (2006.01)
*H04N 9/31* (2006.01)
*G05D 1/10* (2006.01)

(52) U.S. Cl.
CPC ......... *G05D 1/0094* (2013.01); *B64C 39/024* (2013.01); *G05B 13/0265* (2013.01); *G05D 1/0027* (2013.01); *G05D 1/101* (2013.01); *G09F 19/18* (2013.01); *H04N 9/3147* (2013.01); *B64C 2201/12* (2013.01)

(58) Field of Classification Search
CPC .................................................... H04N 7/005

USPC ......................................................... 348/144
See application file for complete search history.

(56) References Cited

U.S. PATENT DOCUMENTS

| 7,113,867 B1 | 9/2006 | Stein |
| 7,466,241 B2 | 12/2008 | Lyle |
| 8,254,338 B2 | 8/2012 | Anschutz |
| 8,447,421 B2 | 5/2013 | Capio |

(Continued)

FOREIGN PATENT DOCUMENTS

| CN | 204117561 U | 1/2015 |
| WO | 2013025803 A1 | 2/2013 |

*Primary Examiner* — Jefferey F Harold
*Assistant Examiner* — Sihar A Karwan
(74) *Attorney, Agent, or Firm* — Schmeiser, Olsen & Watts; Brian M. Restauro

(57) ABSTRACT

A method and system for automatically implementing vehicular implemented projection improvement process is provided. The method includes directing flying vehicles to a location comprising a projection apparatus. The vehicles are directed such that each vehicle is periodically positioned within a perimeter surrounding the location with respect to multiple lines of sight of the projection device. The location is monitored and obstructions and associated positions with respect to each line of sight are determined. Resulting parameters associated with the projection device, weather conditions, projection content, and the obstructions and associated positions are determined and a virtual visibility fence associated with an area for viewing the projection content on the projection device is generated. Specified projection content for projecting on a specified portion of the projection device is determined and projected.

20 Claims, 8 Drawing Sheets

(56) References Cited

U.S. PATENT DOCUMENTS

| | | |
|---|---|---|
| 2003/0046158 A1 | 3/2003 | Kratky |
| 2009/0125343 A1 | 5/2009 | Cradick |
| 2010/0022311 A1 | 9/2010 | Griffin |
| 2013/0060642 A1 | 3/2013 | Shlomot |
| 2013/0127980 A1 | 5/2013 | Haddick |
| 2013/0129149 A1 | 5/2013 | Nandakumar |
| 2014/0344062 A1 | 11/2014 | Lamont |
| 2015/0081421 A1 | 3/2015 | Moseman |
| 2015/0363828 A1 | 12/2015 | Mantalovos |
| 2016/0041628 A1* | 2/2016 | Verma .................... G06F 3/017 345/156 |
| 2016/0292744 A1 | 10/2016 | Strimaitis et al. |
| 2016/0337626 A1* | 11/2016 | Mima .................. H04N 9/3194 |
| 2018/0075481 A1 | 3/2018 | Adoni |
| 2019/0051224 A1* | 2/2019 | Marshall ................ G03B 29/00 |
| 2019/0227555 A1 | 7/2019 | Sun et al. |

* cited by examiner

VEHICULAR IMPLEMENTED PROJECTION

FIELD

The present invention relates generally to a method for implementing a vehicular implemented projection process and in particular to a method and associated system for improving vehicular technology by directing and controlling vehicles such that the vehicles determine content projection attributes.

BACKGROUND

Determining typical object presentation options may include an inaccurate process with little flexibility. Controlling and directing various movable objects for presenting specialized content may include a complicated process that may be time consuming and require a large amount of resources. Additionally, directing movable objects to specified locations for detecting presentation obstacle may require technically advanced systems for enabling detection functionality.

SUMMARY

A first aspect of the invention provides a method comprising: first directing, by a processor of a controller hardware device, a plurality of vehicles to a location comprising a projection apparatus; second directing, by the processor at the location, the plurality of vehicles such that each vehicle of the plurality of vehicles is periodically positioned within a perimeter surrounding the location with respect to multiple lines of sight of at least a portion of the projection device; monitoring, by the processor via sensors of each the vehicle, the location; determining, by the processor based on the data retrieved from the sensors, obstructions and associated positions with respect to each line of sight of the multiple lines of sight; determining, by the processor based on the obstructions and associated positions, parameters associated with the projection device, weather conditions, projection content, and the obstructions and associated positions; generating, by the processor, a virtual visibility fence associated with an area for viewing, via moving vehicles on a roadway, the projection content on the projection device at a specified time; determining, by the processor based on the virtual visibility fence, specified projection content of the projection content for projecting on a specified portion of the projection device; and projecting, by the processor via a projector, the specified projection content on the specified portion of the projection device.

A second aspect of the invention provides a computer program product, comprising a computer readable hardware storage device storing a computer readable program code, the computer readable program code comprising an algorithm that when executed by a processor of a controller hardware device implements a method, the method comprising: first directing, by the processor, a plurality of vehicles to a location comprising a projection apparatus; second directing, by the processor at the location, the plurality of vehicles such that each vehicle of the plurality of vehicles is periodically positioned within a perimeter surrounding the location with respect to multiple lines of sight of at least a portion of the projection device; monitoring, by the processor via sensors of each the vehicle, the location; determining, by the processor based on the data retrieved from the sensors, obstructions and associated positions with respect to each line of sight of the multiple lines of sight; determining, by the processor based on the obstructions and associated positions, parameters associated with the projection device, weather conditions, projection content, and the obstructions and associated positions; generating, by the processor, a virtual visibility fence associated with an area for viewing, via moving vehicles on a roadway, the projection content on the projection device at a specified time; determining, by the processor based on the virtual visibility fence, specified projection content of the projection content for projecting on a specified portion of the projection device; and projecting, by the processor via a projector, the specified projection content on the specified portion of the projection device.

A third aspect of the invention provides a controller hardware device comprising a processor coupled to a computer-readable memory unit, the memory unit comprising instructions that when executed by the processor executes a method comprising: first directing, by the processor, a plurality of vehicles to a location comprising a projection apparatus; second directing, by the processor at the location, the plurality of vehicles such that each vehicle of the plurality of vehicles is periodically positioned within a perimeter surrounding the location with respect to multiple lines of sight of at least a portion of the projection device; monitoring, by the processor via sensors of each the vehicle, the location; determining, by the processor based on the data retrieved from the sensors, obstructions and associated positions with respect to each line of sight of the multiple lines of sight; determining, by the processor based on the obstructions and associated positions, parameters associated with the projection device, weather conditions, projection content, and the obstructions and associated positions; generating, by the processor, a virtual visibility fence associated with an area for viewing, via moving vehicles on a roadway, the projection content on the projection device at a specified time; determining, by the processor based on the virtual visibility fence, specified projection content of the projection content for projecting on a specified portion of the projection device; and projecting, by the processor via a projector, the specified projection content on the specified portion of the projection device.

The present invention advantageously provides a simple method and associated system capable of determining presentation options.

DETAILED DESCRIPTION

Figure 1:
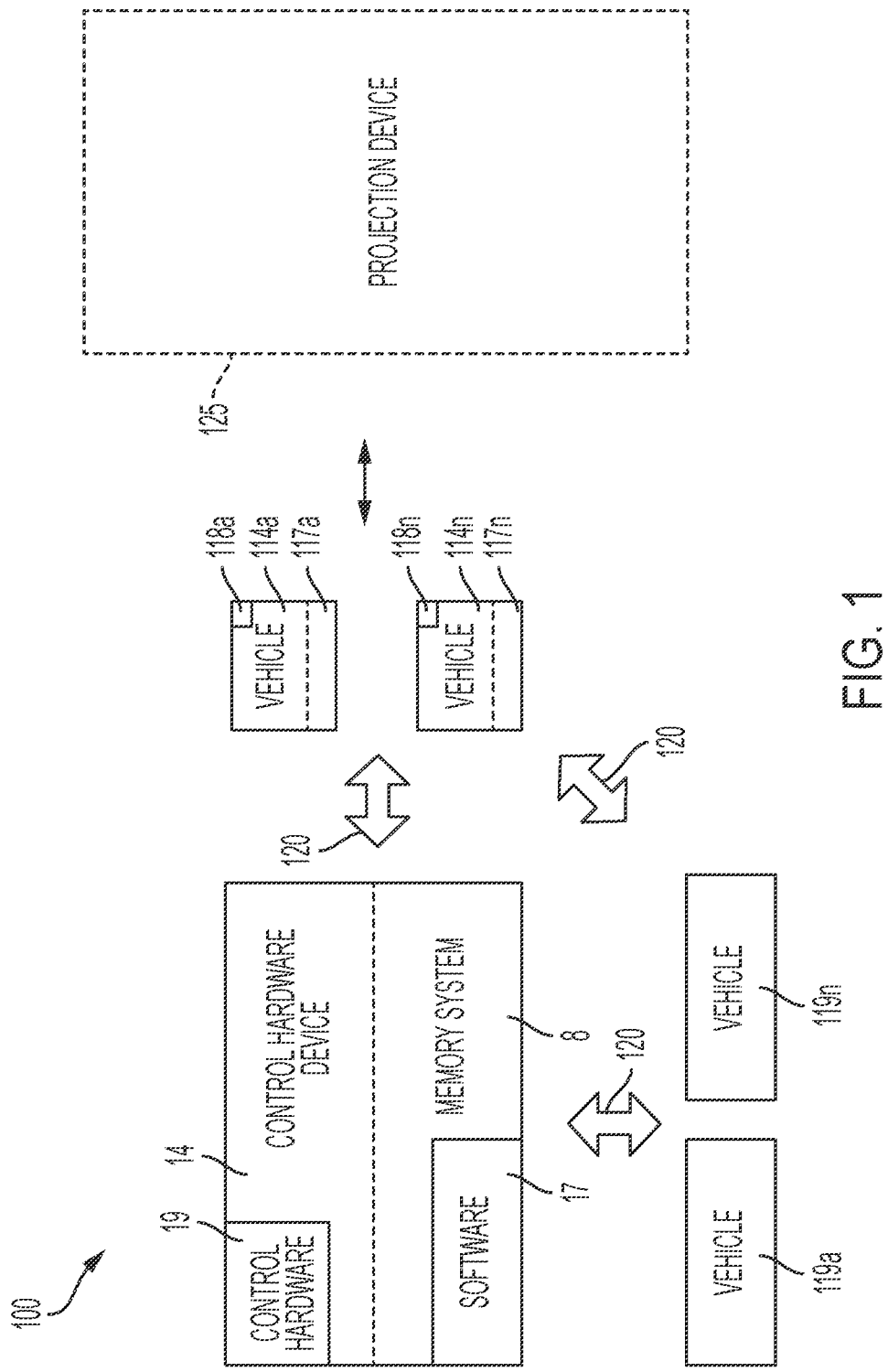
FIG. 1 illustrates a system for implementing an autonomous vehicular implemented projection improvement with respect to directing and controlling vehicles for determining content projection attributes, in accordance with embodiments of the present invention.

FIG. 1 illustrates a system 100 for implementing an autonomous vehicular implemented projection improvement with respect to directing and controlling vehicles 114a . . . 114n such that the vehicles 114a . . . 114n determine content projection attributes, in accordance with embodiments of the present invention. System 100 enables vehicles for optimizing projection content for projection on a projection device 125 (e.g., a billboard, a holographic image projector, etc.) for a group of vehicles 119a . . . 119n (e.g., automobiles or trucks traveling along a highway) based a visibility with respect to projection device 125. System 100 is further enabled to dynamically predict a specified target audience and density for a given dynamically predicted visibility fence 351 of any given public display system by leveraging cognitive IoT devices. Vehicles 114a . . . 114n are configured to initiate flight (with respect to a specific offset from the ground) and monitor traffic flow, traffic velocity, obstructions, offset of vehicles 119a . . . 119n, line of site (above and below the obstructions) and driver preferences to optimize the projection content and placement on projection device 125.

Figure 4:
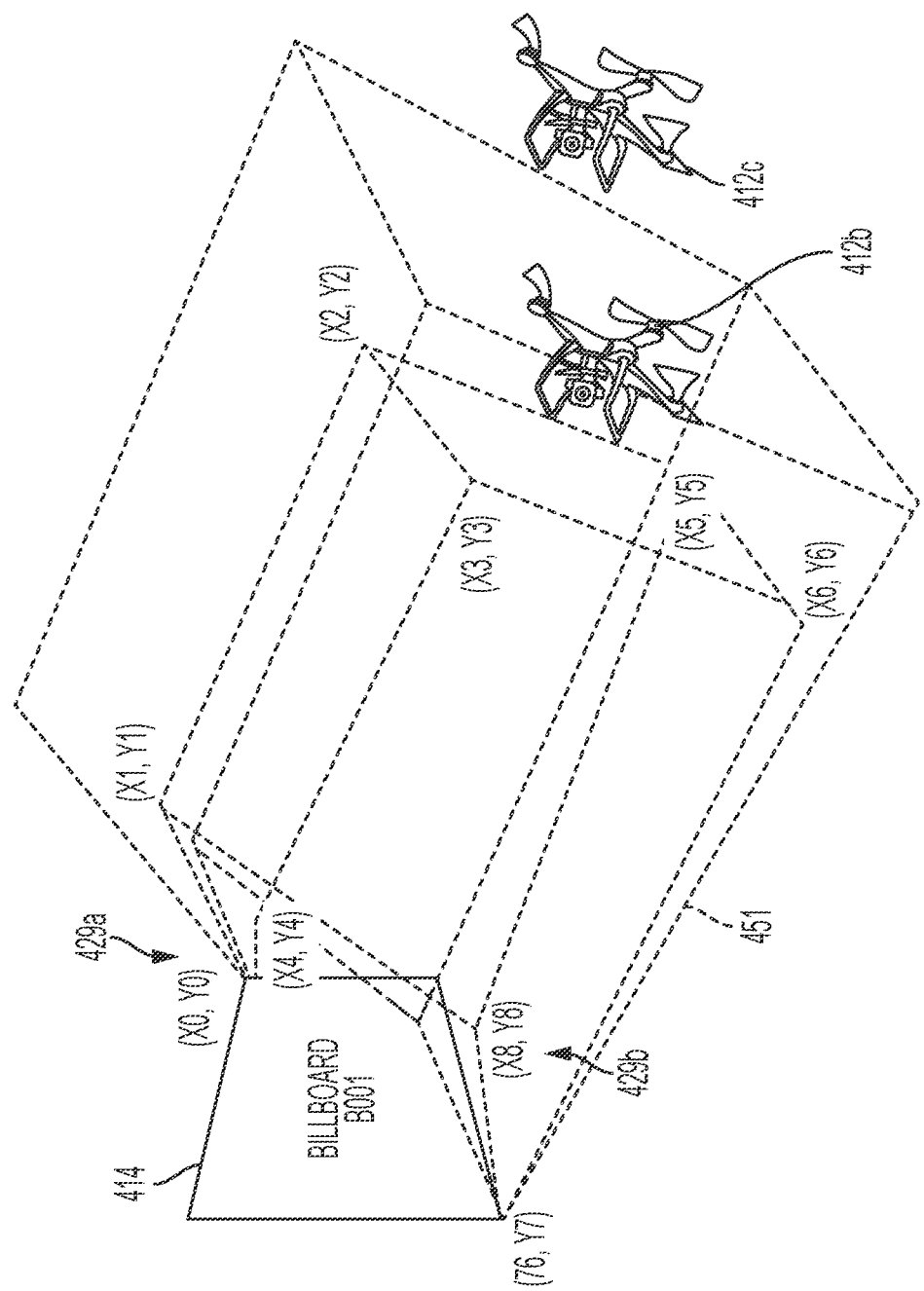
FIG. 4 illustrates a process for generating three-dimensional visibility fencing structure, in accordance with embodiments of the present invention.
Figure 5:
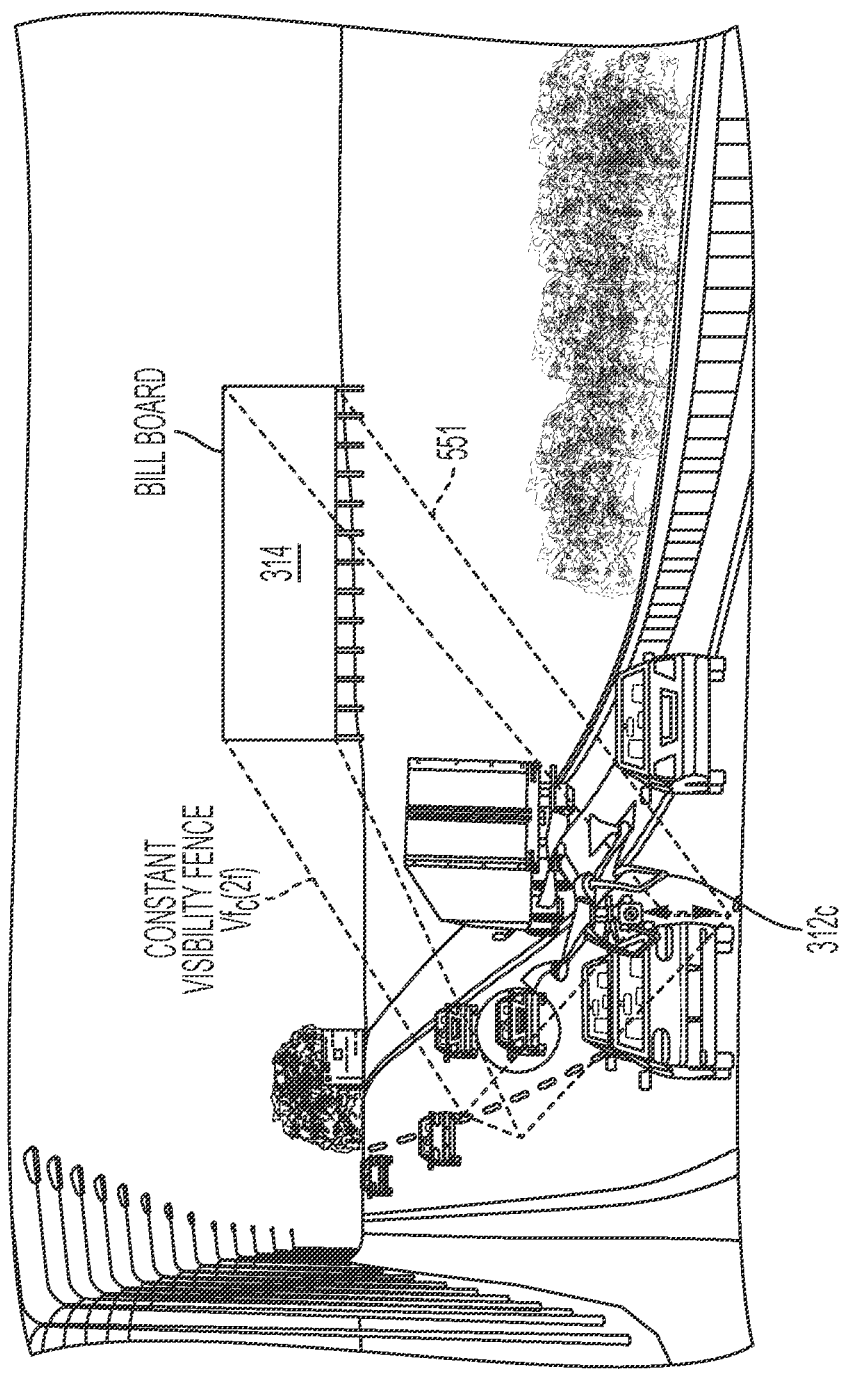
FIG. 5 illustrates content and placement of advertisements on billboard for maintaining maximum visibility and attention, in accordance with embodiments of the present invention.

System 100 leverages IoT technology to optimize content placement on any given presentation means (projection device 125) for vehicles in traffic based on an associated visibility to drivers in the area. System 100 improves projection technology by dynamically predicting a specific target audience and density for a dynamically predicted visibility fence of any given public display system by leveraging cognitive IoT. The visibility fence may be generated by dynamically calculating a vector of a three-dimensional visibility fence trapezoid (e.g., as illustrated in FIGS. 4 and 5) for any given group of public display systems by considering associated dimensions (i.e., length, width, and height) for any given weather condition, line of sight properties with respect to drivers, an offset of vehicles, an offset of obstructions in the line of sight of the vehicles, and future vehicle positioning for any given projection content size and properties.

System 100 enables the following functionality:

Calculation of a three-dimensional visibility fence of trapezoids via usage of vehicles 114a . . . 114n for determining an offset of vehicles 119a . . . 119n from a ground level, an offset of obstructions within the line of sight of vehicles 119a . . . 119n, and types of obstructions present with respect to a given road segment. Additionally, vehicles 114 . . . 114n perform process for mapping a trapezoidal offset via usage of multiple flight offsets and wave patterns.

System 100 of FIG. 1 includes a control hardware device 14 in communication with vehicles 114a . . . 114n and a projection device 125 (for presenting content to vehicles 119a . . . 119n) via a wireless network 120. Vehicles 114a . . . 114n comprise software 117a . . . 117n including specialized software scripts for executing an autonomous vehicular implemented projection improvement process with respect to directing vehicles 114a . . . 114n. Vehicles 114a . . . 114n (i.e., control hardware 118a . . . 118n internal to vehicles 114a . . . 114n) and control apparatus 14 each may comprise an embedded computer. An embedded computer is defined herein as a remotely portable dedicated computer comprising a combination of computer hardware and software (fixed in capability or programmable) specifically designed for executing a specialized function. Programmable embedded computers may comprise specialized programming interfaces. Additionally, vehicles 114a . . . 114n (i.e., control hardware 118a . . . 118n internal to vehicles 114a . . . 114n vehicles) and control apparatus 14 may each comprise a specialized hardware device comprising specialized (non-generic) hardware and circuitry (i.e., specialized discrete non-generic analog, digital, and logic-based circuitry) for executing a process described with respect to FIGS. 1-8. The specialized discrete non-generic analog, digital, and logic-based circuitry may include proprietary specially designed components (e.g., a specialized integrated circuit designed for only implementing an autonomous vehicular implemented projection improvement with respect to directing and controlling vehicles 114a . . . 114n such that the vehicles 114a . . . 114n determine content projection attributes. Control apparatus 14 includes a memory system 8, software 17, and control hardware 19 (all sensors and associated control hardware for enabling software 17 to execute a process for coordinating vehicles 114a . . . 114n for implementing a vehicular implemented projection improvement process). Control hardware 118a . . . 118n includes sensors. Sensors may include, inter alia, GPS sensors, video recording devices, audio enabled devices (i.e., including speakers and microphones), optical sensors, weight sensors, etc. The memory system 8 may include a single memory system. Alternatively, the memory system may include a plurality of memory systems. Each of vehicles 114a . . . 114n may comprise any vehicle that does not require a human operator to be located within the vehicles 114a . . . 114n such as, inter alia, a remote controlled vehicle (e.g., an aircraft flown by a pilot at a ground control station), an autonomously controlled vehicle (e.g., an aircraft controlled based on pre-programmed flight plans which may include an intelligence algorithm that would enable vehicles 114a . . . 114n to know the aircraft's location and self-determine an item delivery route), a pre-programmed vehicle, etc. Alternatively, vehicles 114a . . . 114n may comprise any type of vehicle that includes a human operator located within the vehicle (e.g., an aircraft, an automobile, a boat or ship, a train, etc.). Vehicles 114a . . . 114n may include, inter alia, an aerial vehicle, a land-based vehicle, a marine (water) based vehicle, etc. Vehicles 119a . . . 119n may comprise any type of vehicle that includes a human operator located within the vehicle (e.g., an automobile).

System 100 of FIG. 1 enables a process for: delivering projection content (e.g., an advertisement on electronic billboards/monitors) and adjusting a type, content, and placement of projection content for maximum attention and effect on drivers and passengers in vehicles. The process includes: dynamically defining a three dimensional visibility fence/zone; receiving input from vehicles flying with respect to multiple flight offsets and wave patterns with respect to a driver's line/zone of sight, and an offset of obstructions to different sections of an electronic billboard; delivering projection content within the driver's line of sight; and dynamically adjusting the delivery of the projection content as the driver's line of sight shifts with traffic flow and the vehicle path.

Figure 2:
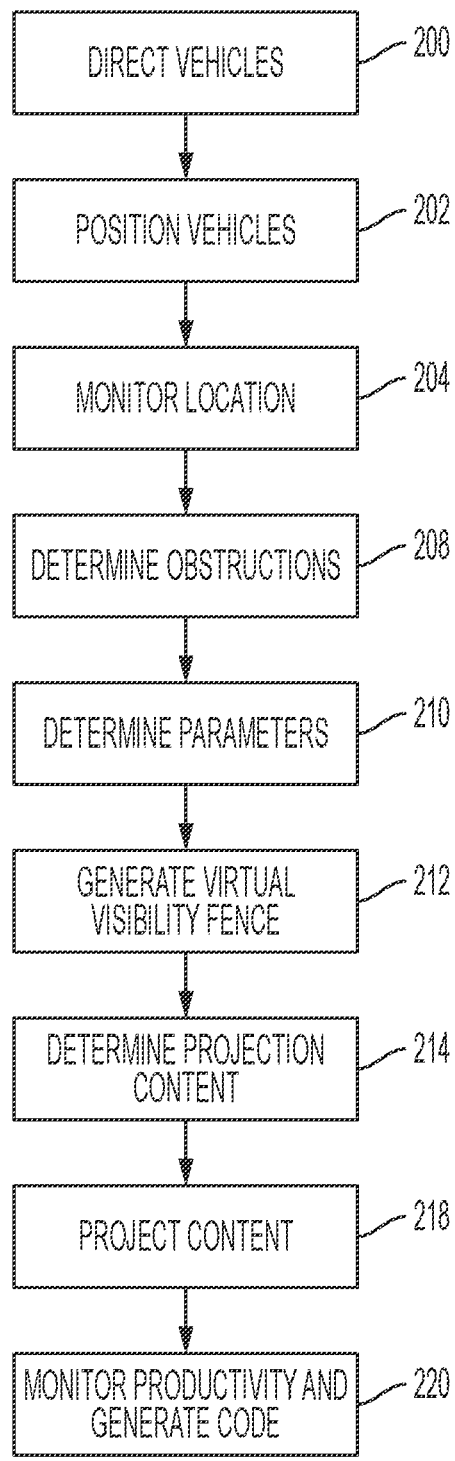
FIG. 2 illustrates an algorithm detailing a process flow enabled by the system of FIG. 1 for implementing an autonomous vehicular implemented projection improvement with respect to directing and controlling vehicles for determining content projection attributes, in accordance with embodiments of the present invention.

FIG. 2 illustrates an algorithm detailing a process flow enabled by system 100 of FIG. 1 for implementing an autonomous vehicular implemented projection improvement with respect to directing and controlling vehicles for determining content projection attributes, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by vehicles 114a . . . 114n (i.e., control hardware 118a . . . 118n internal to vehicles 114a . . . 114n) and control hardware device 14 of FIG. 1. In step 200, a plurality of vehicles are directed to a location comprising a projection device. In step 202, the plurality of vehicles are periodically positioned within a perimeter surrounding the location with respect to multiple lines of sight with respect to a portion of the projection device. In step 204, the location is monitored by via sensors of each vehicle. The sensors may include, inter alia, thermal imaging sensors, optical sensors, video cameras, altimeters, IoT proximity sensors, etc.

In step 208, obstructions and associated positions with respect to each line of sight are determined based on data retrieved from the sensors. Obstructions and associated positions with respect to each line of sight may be determined by detecting offset distances for eyes of passengers in vehicles with respect to roadway thereby representing heights of different sized vehicles traveling along the highway. The offsets are configured for determining obstructions and associated locations within a line of sight with respect to a projection device. Obstructions may include permanent obstructions (e.g., trees, fences, utility poles, etc.), temporary obstructions (e.g., moving vehicles, etc.), etc. In step 210, parameters associated with the projection device determined based on the obstructions and associated positions. Additionally, current weather conditions are detected (e.g., foggy, rainy, sunny, etc.) for further determining visibility issues with respect to providing additional obstructions (e.g., poor weather leads to poor visibility). Obstructions associated with weather conditions may be determined by detecting (e.g., via optical or moisture sensors) lighting and/or moisture conditions. In step 212, a virtual visibility fence is generated. The virtual visibility fence is associated with an area for viewing (by moving vehicles on a roadway) the projection content on projection device at a specified time. The virtual visibility fence may include a single virtual three-dimensional trapezoidal structure. Generating the virtual visibility fence comprising the single virtual three-dimensional trapezoidal structure may comprise: determining a first offset measurement of moving vehicles with respect to the roadway; determining a second offset measurement of obstructions with respect to the multiple lines of sight of the portion of the projection device; determining, types of obstructions; determining multiple flight offsets and wave patterns associated with the plurality of vehicles; and analyzing the obstructions associated with weather conditions. Alternatively, the virtual visibility fence may comprise multiple adjacent virtual three-dimensional trapezoidal structures.

In step 214, specified projection content for projecting on a specified portion of the projection device is determined based on the virtual visibility fence. In step 218, the specified projection content is projected (via a projector) on said specified portion of the projection device. Projecting the specified projection content on the specified portion of the projection device may include, inter alia, projecting information on a billboard adjacent to a roadway, projecting holographic images in a specified area adjacent to a roadway, etc.

In step 220, a resulting productivity of projecting the specified content is monitored via projection sensors integrated with the projection device. Additionally, self-learning software code for executing future processes for determining additional specified projection content for projecting on a future specified portion of the projection device is generated.

Figure 3:
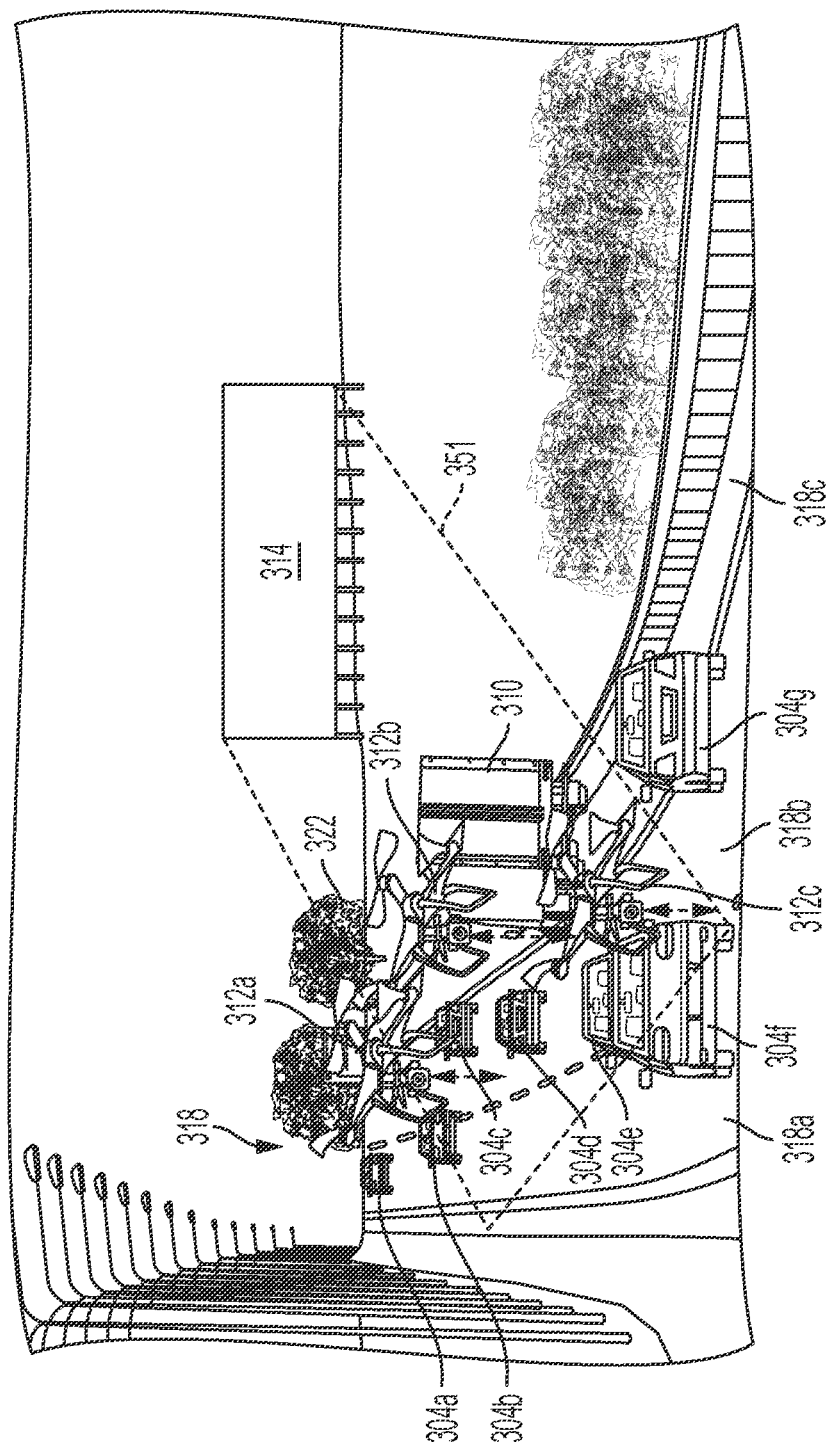
FIG. 3 illustrates vehicles leveraged to fly during periodic intervals with respect to different offsets from the ground, in accordance with embodiments of the present invention.

FIGS. 3-5 illustrate an implementation example for monitoring traffic flowing on a highway towards a sporting, in accordance with embodiments of the present invention. Likewise, a significant number of occupants within vehicles in the coverage area are fans of a specified team.

FIG. 3 illustrates vehicles 312a . . . 312c leveraged to fly during periodic intervals with respect to different offsets from the ground. The offsets represent offsets for the eyes of passengers (in vehicles 312a . . . 312c) with respect to the ground thereby representing heights of different sized vehicles 304a . . . 304f and 310 (e.g., sedans, SUVs, trucks, etc.) traveling along a highway 318 to determine obstructions (e.g., tree 312, truck 310, etc.) and associated locations within a line of sight with respect to a billboard 314. Vehicles 312a . . . 312c enable thermal imaging sensors, altimeters, and IoT proximity sensors to detect and determine the obstructions. For example, vehicles 312a . . . 312c may register sensor data at a time instant tr. Additionally, an offset of permanent obstructions (e.g., lamp posts, electricity towers, trees etc.) is represented as Otr. FIG. 3 illustrates billboard 318 (BB01) as a public display system stationed along highway 318 (comprising lanes 318a, 318b, and 318c represented as L, M, and R, respectively). Vehicles 304a . . . 304g (C1 . . . C7, respectively) and truck 310 (T1) are traveling by billboard 318 (BB01) during normal weather conditions. Additionally, vehicles 312a . . . 312c (D1 . . . D3, respectively) are configured to generate a three-dimensional visibility fencing structure (e.g., three-dimensional visibility fencing structure 451 or 551 in FIGS. 3B and 3C, infra). A two-dimensional visibility fence 351 for billboard 318 (BB01) is represented as Vfc.

The following parameters and associated values are determined in real-time at a time instant t0, where t0>tr: L0=a length of billboard 318 (BB01); B0=a breadth of billboard 318 (BB01); H0=a height of billboard 318 (BB01); Wi=a type of weather (e.g., 1=stormy, 2=foggy, 3=rainy, 4=sunny, 5=normal, etc.); Ads=advertisement content size (comprising an image, text, or image and text such as e.g., 1->50, 2->75, 3->100, 4->150, 5->200); Ads=advertisement content color (e.g., 1=yellow, 2=blue, 3=green, 4=red, 5=black, etc.); Vo=an offset of vehicles; and Oo=an offset of obstructions such as larger sized vehicles, etc.

FIG. 4 illustrates a process for generating three-dimensional visibility fencing structure 451 based on the aforementioned parameters and associated values described with respect to FIG. 3, supra. At an instance given time t0, the aforementioned parameters and associated values re used to generate three-dimensional visibility fencing structure 451 as follows:

$$Vfc(\text{Offset}) = f(Wi, ADs, ADc, (L0*B0*H0), Vo, Oo, Otr).$$

Vfc is directly proportional to weather conditions (e.g., poor weather leads to poor visibility).

Vfc is directly proportional to a content size and content color.

Vo may be determined via a query with respect to public information supplied by a manufacturer or by automatically calculating offsets for differing vehicles using camera's.

Otr and Oo are determined by leveraging vehicles (e.g., vehicles 312a . . . 312c in FIG. 3) enabling thermal imaging or altimeters and IoT proximity sensor detection to locate an offset of permanent and semi-permanent obstacles.

Vfc(Offset) represents a virtual three-dimensional trapezoid (i.e., three-dimensional visibility fencing structure 451) for any given offset of vehicles with respect to a billboard 414. The eight coordinates (i.e., coordinates 429a . . . 429h) of the virtual three-dimensional trapezoid are represented within a data structure such as an array. The virtual three-dimensional trapezoid depicts the two different three-dimensional visibility fences for the offsets such as, two feet and four feet.

FIG. 5 illustrates content and placement of advertisements on billboard 314 for maintaining maximum visibility and attention. The content and placement of advertisements are determined based on the predicted visibility fence and type and an exact location of vehicles within the visibility fence. Additionally, FIG. 5 illustrates a process for measuring a productivity of the advertisements and tuning weights of the factors in the calculation of the virtual three-dimensional trapezoid. The weights for each factor may be adjusted with a multiplier ranging from 0 to a finite multiple. The aforementioned self-learning step will auto generate rules with correlation techniques relating the weight on the factors in the calculation with the placement of the advertisements and associated productivity. The rules (and associated generated software code) are used to adjust the weights for future runs of the process.

Figure 6:
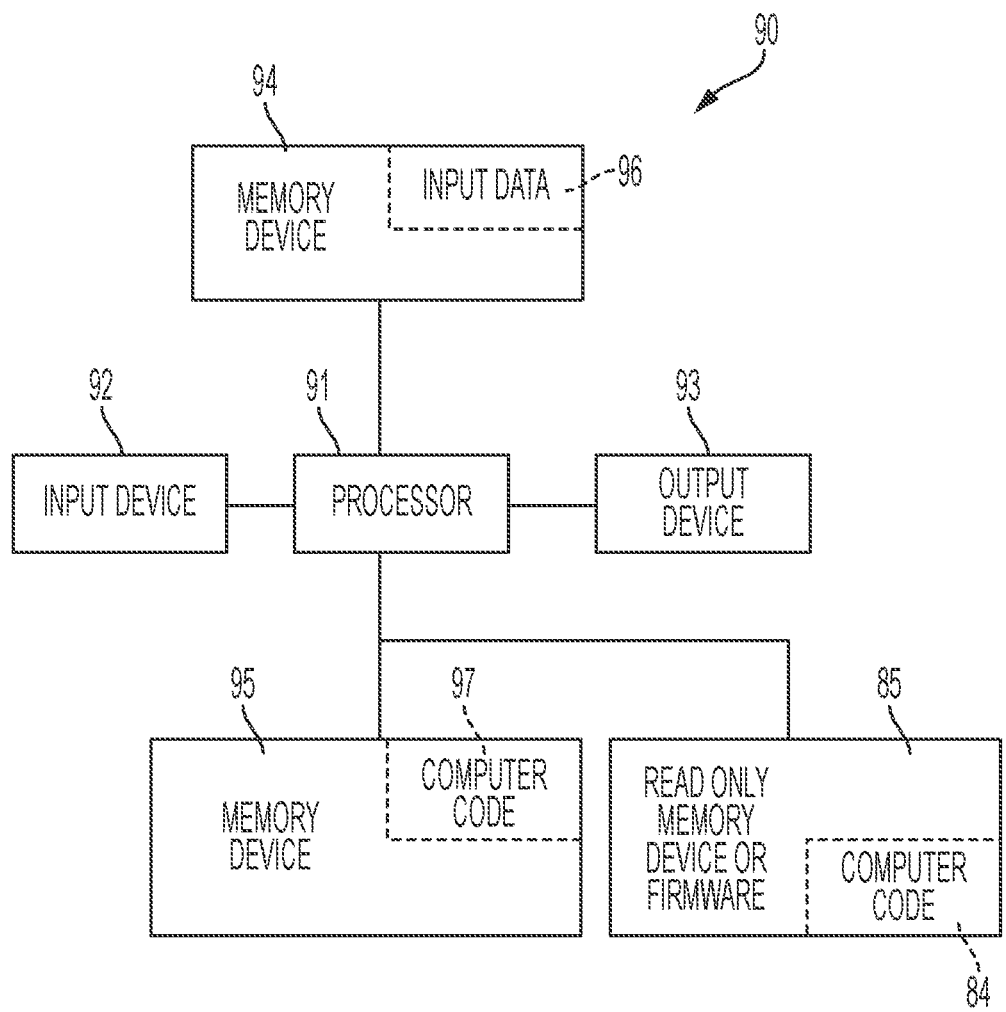
FIG. 6 illustrates a computer system used by the system of FIG. 1 for enabling a process for implementing an autonomous vehicular implemented projection improvement with respect to directing and controlling vehicles for determining content projection attributes, in accordance with embodiments of the present invention.

FIG. 6 illustrates a computer system 90 (e.g., control hardware 118a . . . 118n internal to vehicles 114a . . . 114n and control hardware device 14) used by or comprised by the system of FIG. 1 for enabling a process for implementing an autonomous vehicular implemented projection improvement with respect to directing and controlling vehicles for determining content projection attributes, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 4 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithm of FIG. 2) for enabling a process for implementing an autonomous vehicular implemented projection improvement with respect to directing and controlling vehicles for determining content projection attributes. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithm) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to enable a process for implementing an autonomous vehicular implemented projection improvement with respect to directing and controlling vehicles for determining content projection attributes. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for implementing an autonomous vehicular implemented projection improvement with respect to directing and controlling vehicles for determining content projection attributes. In another embodiment, the invention provides a business method that performs the process steps of the invention on a subscription, advertising, and/or fee basis. That is, a service supplier, such as a Solution Integrator, could offer to enable a process for implementing an autonomous vehicular implemented projection improvement with respect to directing and controlling vehicles for determining content projection attributes. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
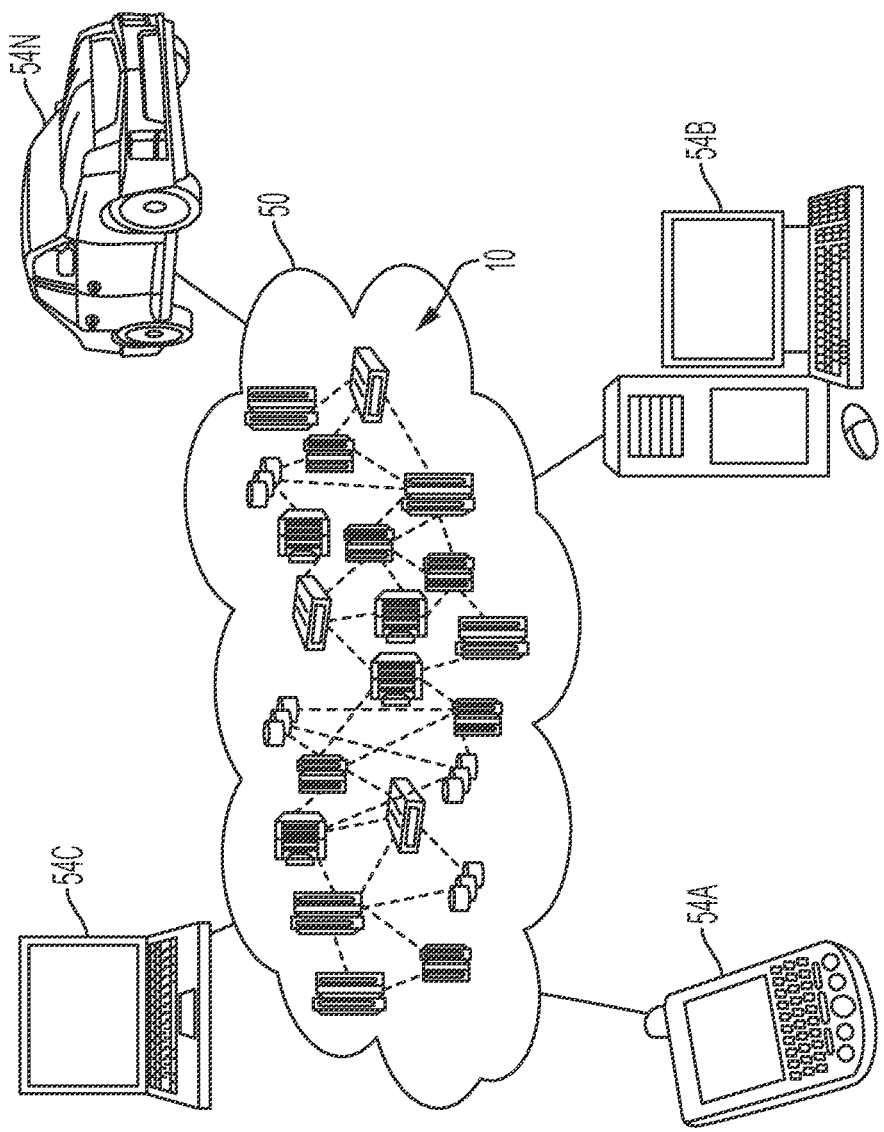
FIG. 7 illustrates a cloud computing environment, in accordance with embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 5 are intended to be illustrative only and that computing nodes 10 and cloud computing environment 50 can communicate with any type of computerized device over any type of network and/or network addressable connection (e.g., using a web browser).

Figure 8:
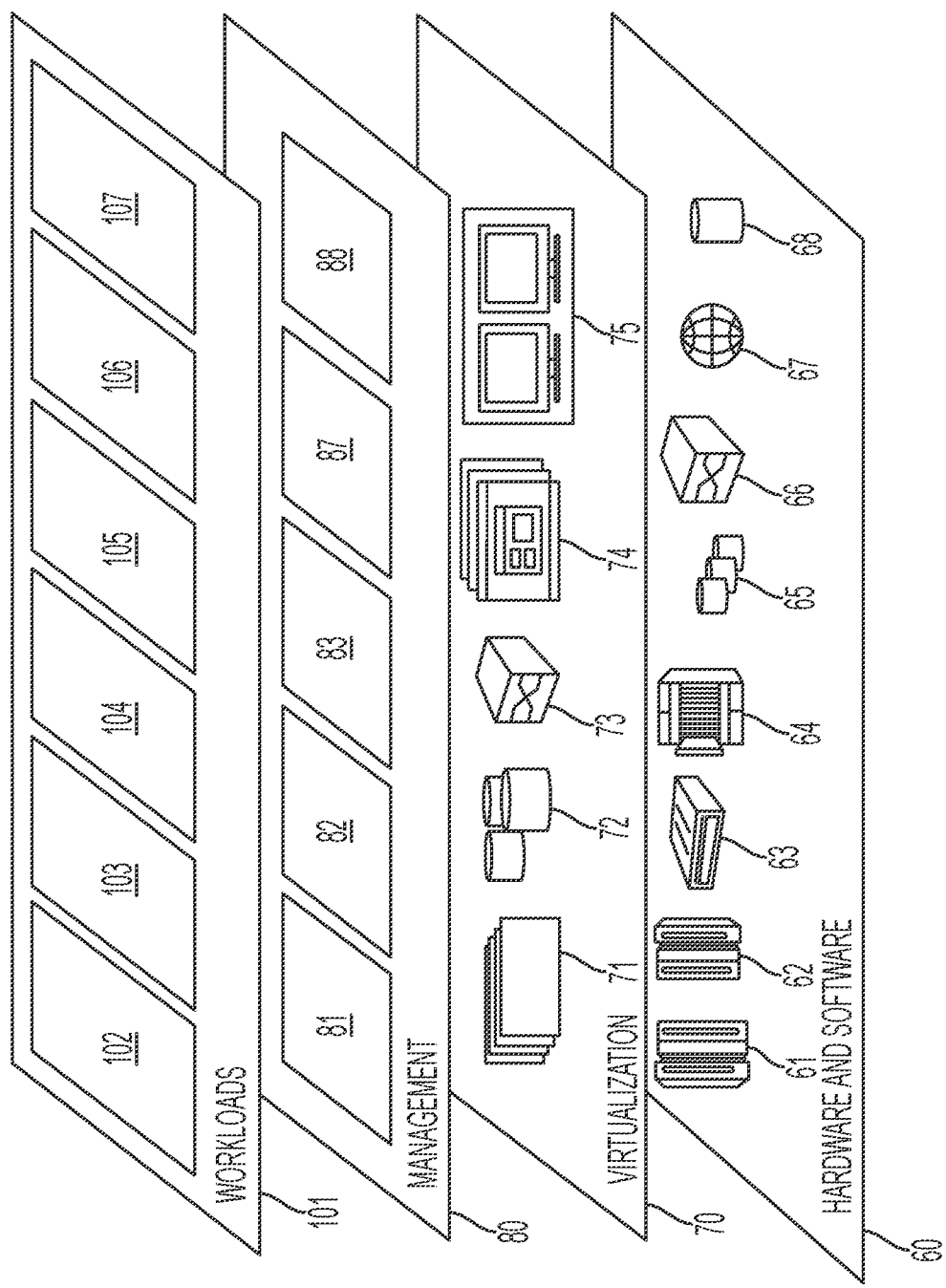
FIG. 8 illustrates a set of functional abstraction layers provided by cloud computing environment, in accordance with embodiments of the present invention.

Referring now to FIG. 8, a set of functional abstraction layers provided by cloud computing environment 50 (see FIG. 7) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 104; data analytics processing 105; transaction processing 106; and implementing an autonomous vehicular implemented projection improvement with respect to directing and controlling vehicles for determining content projection attributes 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method comprising:
    first directing, by a processor of a controller hardware device, a plurality of vehicles to a location comprising a projection device, wherein said plurality of vehicles comprise flying vehicles;
    second directing, by said processor at said location, said plurality of vehicles such that each vehicle of said plurality of vehicles is periodically positioned within a perimeter surrounding said location with respect to multiple lines of sight of at least a portion of said projection device;
    monitoring, by said processor via sensors of each said vehicle, said location;
    determining, by said processor based on said data retrieved from said sensors, obstructions and associated positions with respect to each line of sight of said multiple lines of sight;
    determining, by said processor based on said obstructions and associated positions, parameters associated with said projection device;
    detecting, by said processor executing said sensors, lighting and moisture conditions associated with said location;
    determining, by said processor in response to results of said detecting, current weather conditions associated with visibility issues creating additional obstructions;
    detecting, by said processor executing said sensors, offset distances for eyes of passengers, within moving vehicles on a roadway, with respect to said roadway;
    determining, by said processor based on results of said detecting said offset distances, height distances of said moving vehicles with respect to said roadway;
    generating, by said processor based on said parameters, said height distances, and said current weather conditions, a virtual visibility fence associated with an area for viewing, via said moving vehicles on said roadway, said projection content on said projection device at a specified time;
    determining, by said processor based on said virtual visibility fence, specified projection content of said projection content for projecting on a specified portion of said projection device; and
    projecting, by said processor via a projector, said specified projection content on said specified portion of said projection device.

2. The method of claim 1, further comprising: monitoring, by said processor via a plurality of projection sensors integrated with said projection device, a resulting productivity of said projecting; and generating, by said processor based on said resulting productivity of said projecting, self learning software for executing future processes for determining additional specified projection content for projecting on a future specified portion of said projection device and projecting said additional specified projection content on said future specified portion of said projection device.

3. The method of claim 1, wherein said sensors comprise sensing devices selected from the group consisting of thermal imaging sensors, optical sensors, video cameras, altimeters, and IoT proximity sensors.

4. The method of claim 1, wherein said obstructions comprise permanent obstructions.

5. The method of claim 1, wherein said obstructions comprise temporary periodic obstructions.

6. The method of claim 1, wherein said temporary periodic obstructions comprise additional moving vehicles on said roadway.

7. The method of claim 1, wherein said virtual visibility fence comprises a single virtual three-dimensional trapezoidal structure.

8. The method of claim 7, wherein said generating said virtual visibility fence comprising said single virtual three-dimensional trapezoidal structure comprises: determining, a first offset measurement of said moving vehicles with respect to said roadway; determining, a second offset measurement of said obstructions with respect to said multiple lines of sight of said at least said portion of said projection device; and determining, types of said obstructions.

9. The method of claim 7, wherein said generating said virtual visibility fence comprising said single virtual three-dimensional trapezoidal structure comprises: determining multiple flight offsets and wave patterns associated with said plurality of vehicles.

10. The method of claim 1, wherein said virtual visibility fence comprises multiple adjacent virtual three-dimensional trapezoidal structures.

11. The method of claim 1, wherein said projecting said specified projection content on said specified portion of said projection device comprises projecting information on a billboard adjacent to said roadway.

12. The method of claim 1, wherein said projecting said specified projection content on said specified portion of said projection device comprises projecting holographic images in a specified area adjacent to a roadway.

13. The method of claim 1, further comprising: providing at least one support service for at least one of creating, integrating, hosting, maintaining, and deploying computer-readable code in the controller hardware device, said code being executed by the processor to implement: said first directing, said second directing, said monitoring, said determining said obstructions, said determining said parameters, said generating, said determining said specified projection content, and said projecting.

14. A non transitory computer program product, comprising a computer readable hardware storage device storing a computer readable program code, said computer readable program code comprising an algorithm that when executed by a processor of a controller hardware device implements a method, said method comprising:
  first directing, by said processor, a plurality of vehicles to a location comprising a projection device, wherein said plurality of vehicles comprise flying vehicles;
  second directing, by said processor at said location, said plurality of vehicles such that each vehicle of said plurality of vehicles is periodically positioned within a perimeter surrounding said location with respect to multiple lines of sight of at least a portion of said projection device;
  monitoring, by said processor via sensors of each said vehicle, said location;
  determining, by said processor based on said data retrieved from said sensors, obstructions and associated positions with respect to each line of sight of said multiple lines of sight;
  determining, by said processor based on said obstructions and associated positions, parameters associated with said projection device;
  detecting, by said processor executing said sensors, lighting and moisture conditions associated with said location;
  determining, by said processor in response to results of said detecting, current weather conditions associated with visibility issues creating additional obstructions;
  detecting, by said processor executing said sensors, offset distances for eyes of passengers, within moving vehicles on a roadway, with respect to said roadway;
  determining, by said processor based on results of said detecting said offset distances, height distances of said moving vehicles with respect to said roadway;
  generating, by said processor based on said parameters, said height distances, and said current weather conditions, a virtual visibility fence associated with an area for viewing, via said moving vehicles on said roadway, said projection content on said projection device at a specified time;
  determining, by said processor based on said virtual visibility fence, specified projection content of said projection content for projecting on a specified portion of said projection device; and
  projecting, by said processor via a projector, said specified projection content on said specified portion of said projection device.

15. The computer program product of claim 14, wherein said method further comprises: monitoring, by said processor via a plurality of projection sensors integrated with said projection device, a resulting productivity of said projecting; and generating, by said processor based on said resulting productivity of said projecting, self learning software for executing future processes for determining additional specified projection content for projecting on a future specified portion of said projection device and projecting said additional specified projection content on said future specified portion of said projection device.

16. The computer program product of claim 14, wherein said sensors comprise sensing devices selected from the group consisting of thermal imaging sensors, optical sensors, video cameras, altimeters, and IoT proximity sensors.

17. The computer program product of claim 14, wherein said obstructions comprise permanent obstructions.

18. The computer program product of claim 14, wherein said obstructions comprise temporary periodic obstructions.

19. The computer program product of claim 14, wherein said temporary periodic obstructions comprise additional moving vehicles on said roadway.

20. A controller hardware device comprising a processor coupled to a non transitory computer-readable memory unit, said memory unit comprising instructions that when executed by the processor executes a method comprising:
  first directing, by said processor, a plurality of vehicles to a location comprising a projection device, wherein said plurality of vehicles comprise flying vehicles;
  second directing, by said processor at said location, said plurality of vehicles such that each vehicle of said plurality of vehicles is periodically positioned within a perimeter surrounding said location with respect to multiple lines of sight of at least a portion of said projection device;
  monitoring, by said processor via sensors of each said vehicle, said location;
  determining, by said processor based on said data retrieved from said sensors, obstructions and associated positions with respect to each line of sight of said multiple lines of sight;
  determining, by said processor based on said obstructions and associated positions, parameters associated with said projection device;
  detecting, by said processor executing said sensors, lighting and moisture conditions associated with said location;
  determining, by said processor in response to results of said detecting, current weather conditions associated with visibility issues creating additional obstructions;
  detecting, by said processor executing said sensors, offset distances for eyes of passengers, within moving vehicles on a roadway, with respect to said roadway;
  determining, by said processor based on results of said detecting said offset distances, height distances of said moving vehicles with respect to said roadway;
  generating, by said processor based on said parameters, said height distances, and said current weather conditions, a virtual visibility fence associated with an area for viewing, via said moving vehicles on said roadway, said projection content on said projection device at a specified time;
  determining, by said processor based on said virtual visibility fence, specified projection content of said projection content for projecting on a specified portion of said projection device; and
  projecting, by said processor via a projector, said specified projection content on said specified portion of said projection device.

* * * * *